(12) United States Patent
Kunin

(10) Patent No.: US 6,217,629 B1
(45) Date of Patent: Apr. 17, 2001

(54) PHOSPHATE SULFUR FERTILIZER PARTICLES AND METHODS FOR MAKING SAME

(75) Inventor: Robert Kunin, Trenton, NJ (US)

(73) Assignee: Rutgers, The State University of New Jersey, Piscataway, NJ (US)

(*) Notice: Subject to any disclaimer, the term of this patent is extended or adjusted under 35 U.S.C. 154(b) by 0 days.

(21) Appl. No.: 09/293,567

(22) Filed: Apr. 15, 1999

(51) Int. Cl.⁷ .................. C05B 13/00; C05B 17/00; C05B 17/02

(52) U.S. Cl. .................. 71/27; 71/28; 71/29; 71/33; 71/48; 71/53

(58) Field of Search ................. 71/26, 32, 33, 71/40, 44, 27, 28, 29, 48, 53

(56) References Cited

U.S. PATENT DOCUMENTS

| | | |
|---|---|---|
| 193,890 | 4/1877 | Panknin . |
| 847,749 * | 3/1907 | Ellis ........................... 71/26 |
| 1,222,112 | 4/1917 | Lipman . |
| 4,133,668 | 1/1979 | Young ........................... 71/11 |
| 4,334,906 | 6/1982 | Young ........................... 71/33 |
| 4,547,213 | 10/1985 | Stoller . |

FOREIGN PATENT DOCUMENTS

| | | |
|---|---|---|
| 1459781 | 12/1976 | (GB) . |
| 2226308 | 6/1990 | (GB) . |
| 61-133123 | 6/1986 | (JP) . |
| 1763436 | 9/1992 | (SU) . |

OTHER PUBLICATIONS

Charleston, A Process for the introduction of elemental sulphur into high analysis phosphate fertilisers, 1987, Fertilizer Research 11, pp. 185–192.*
Perry's Chemical Engineers Handbook sixth edition, 1984, 18–61–66.*
Kittams et al., 1965, Agron, J., 57:331.
Attoe et al., 1966, Soil Sci., 101:317–25.
Nimgade et al., 1962, Diss. Abstr. 23(3):783–4.
Collins, Commercial Fertilizers, P. Blakiston's Son & Co. Inc., Phila.Pa.1933.
Database WPI, section Ch, Week 198631, XP002142559, (No Date).
Database WPI, section Ch, Week 199338, XP002142560, (No Date).

* cited by examiner

*Primary Examiner*—Wayne Langel
(74) *Attorney, Agent, or Firm*—Klauber & Jackson

(57) ABSTRACT

Provided herein are novel porous phosphate sulfur fertilizer particles which are in a continuous phase, and have applications in supplying soluble phosphates to plants and crops, thus increasing the yield of such crops. Also provided are novel methods of producing such porous phosphate sulfur fertilizer particles.

34 Claims, 1 Drawing Sheet

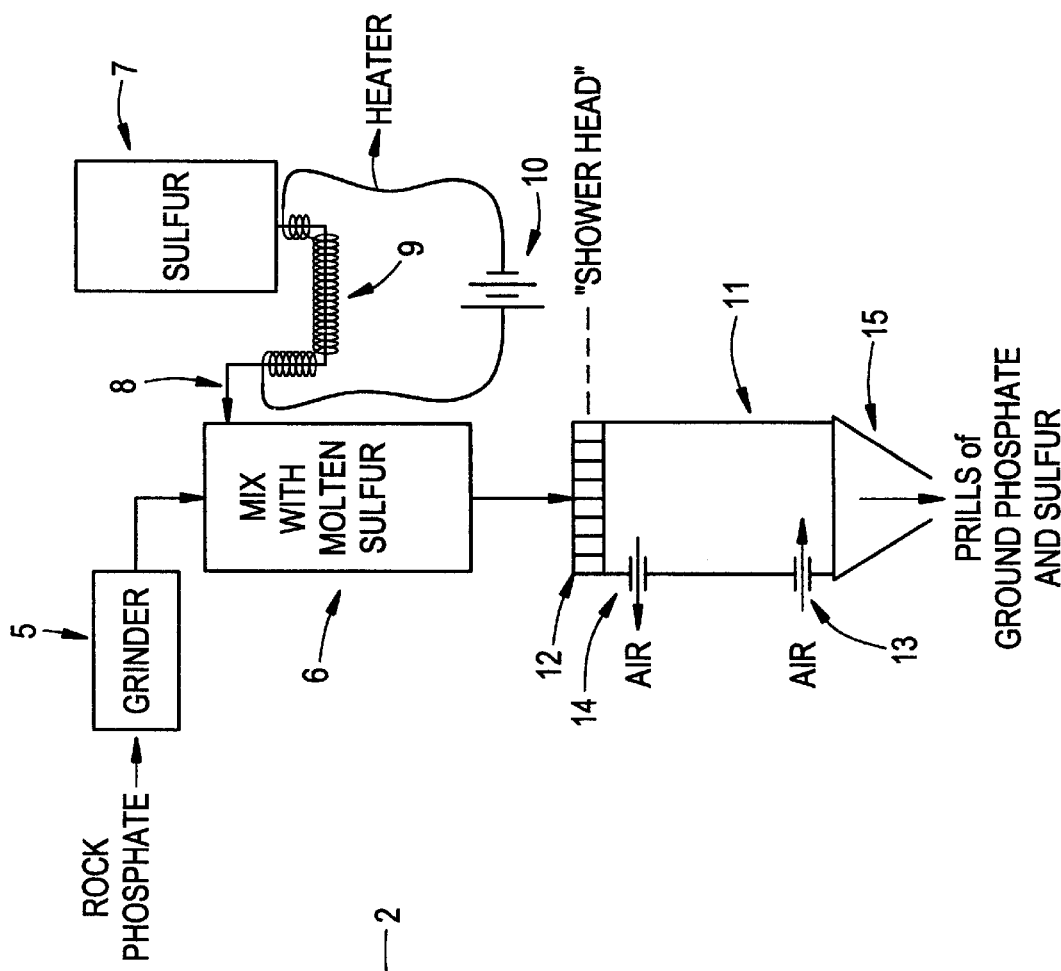
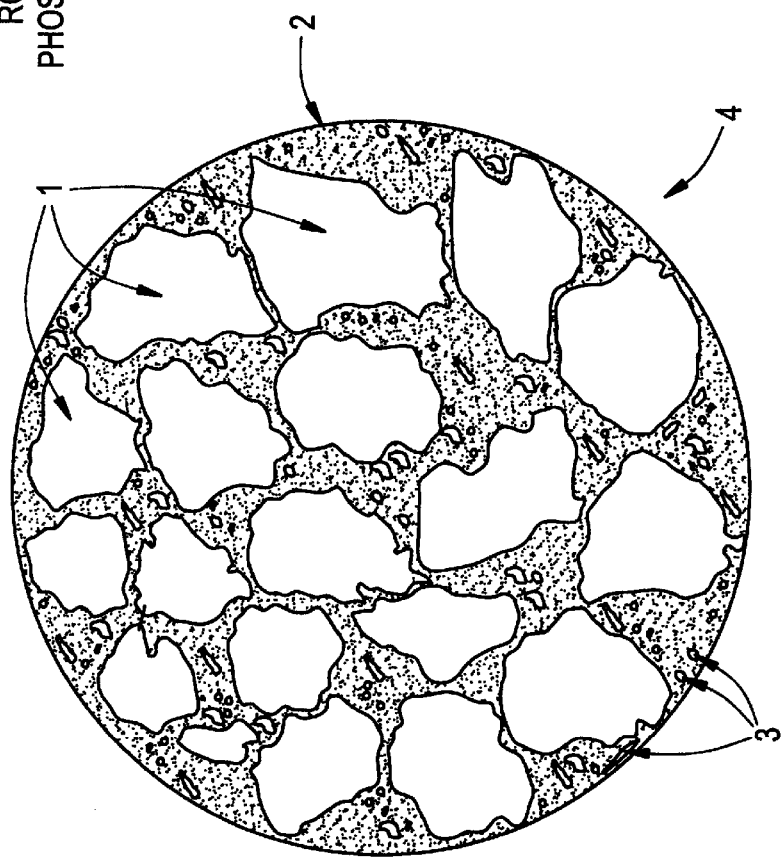

PHOSPHATE SULFUR FERTILIZER PARTICLES AND METHODS FOR MAKING SAME

FIELD OF THE INVENTION

The present invention relates to novel porous phosphate sulfur tertilizer particles and methods of producing such particles, wherein the components of the particles are in a continuous phase.

BACKGROUND OF THE INVENTION

It is recognized by those of skill in the relevant art that phosphorus is a critical nutrient to the growth of plants, and increases crop yields. Thus, efforts have been made to produce fertilizer which increases the amount of soluble phosphate in soil. One such method involves performing a variety of chemical steps. In particular, ground phosphate rock is mixed with concentrated sulfuric acid. This reaction forms green phosphoric acid (30%) and gypsum ($CaSO_4 \cdot 2H_2O$) slimes. The green phosphoric acid is then filtered from these slimes, and concentrated to about 60%. The concentrated phosphoric acid is then reacted with ground phosphate rock particles to form triple superphosphate (TSP), which is then used as fertilizer. The evaporation of the phosphoric acid gives rise to significant quantities of hydrofluoric acid which pollutes the atmosphere.

However, the chemical production of phosphate fertilizer from sulfuric acid has numerous drawbacks. Initially, the process involves the use of containment ponds of concentrated sulfuric and phosphoric acid. Acid from these ponds can leach into ground water supplies and cause extensive environmental damage. Furthermore, the disposal of waste products from the TSP production process can be expensive. In particular, numerous gypsum slimes are produced as a byproduct of TSP production. These slimes can escape from containment ponds and enter the aquifer, polluting regional water supplies. What's more, other byproducts of the process, such as ammonium and potassium phosphates, can drain into nearby wells, lakes and streams. In those waters, eutrophication processes can occur, which pollute the water and place great strains on the ecosystem.

In order to avoid such environmental damage, efforts have been made to utilize indigenous microorganisms of soil to produce phosphate for consumption by crops. In particular, numerous microorganisms, particularly of the genus Thiobacillus are found in soil which oxidize elemental sulfur into sulfuric acid. Phosphate sulfur fertilizer has been developed to exploit the action of these microorganisms. One such composition involves a mixture of finely-powdered bone or mineral phosphate and finely-powdered sulfur, which are mixed together in a dry state. This mixture is then spread over the land. The Thiobacillus microorganisms oxidize the sulfur to produce sulfuric acid. The sulfuric acid in turn reacts with the phosphate to produce soluble phosphates in the soil. However, the use of this mixture has met with only limited success. In particular, it has been discovered that in order to utilize these microorganisms, contact between the sulfur and the mineral phosphate must be maintained. Since the sulfur and phosphate can be separated in the application of this mixture, contact between the sulfur and phosphate can be lost. As a result, the sulfuric acid produced by the Thiobacillus does not react with the phosphate, and soluble phosphates are not produced.

Another composition utilizing sulfur oxidizing microorganisms in soil involves mixing ground phosphate mineral with molten sulfur to form a slurry. This slurry is then cooled so that it solidifies. The solid is then ground to produce particles containing sulfur and phosphate particles. These fertilizer particles are then spread on soil, where Thiobacillus microorganisms oxidize the sulfur as described above. However, this type of phosphate fertilizer also suffers from limitations. In particular, these types of fertilizers consist mainly of phosphate rock particles coated with sulfur. Thus, even though Thiobacillus microorganisms are able to form sulfuric acid from this sulfur coating, the sulfuric acid produced is unable to react with the phosphate rock until the entire coating of sulfur has been removed. As a result, the reaction between the sulfuric acid and phosphate rock particles is poor, and the amount of soluble phosphate delivered to plants with this type of fertilizer is low.

Accordingly, what is needed is a novel phosphate fertilizer particle which exploits the function of indigenous microorganisms, but permits phosphate rock particles to be readily available for reaction with sulfuric acid produced by such microorganisms. As a result, the production rate of soluble phosphate for use by crops is increased for a given period of time.

What is also needed is novel method for producing a phosphate fertilizer particle wherein the phosphate is not completely sealed within sulfur, such that phosphate is available for immediate reaction with sulfuric acid produced by indigenous Thiobacullus milcroorganisms.

The citation of any reference herein should not be construed as an admission that such reference is available as "Prior Art" to the instant application.

SUMMARY OF THE INVENTION

Broadly, the present invention extends to a method for producing a porous phosphate sulfur fertilizer particle which is in a continuous phase, wherein the method comprising the steps of:

a) mixing ground phosphate rock particles with molten sulfur to form a slurry;

b) whipping air into the slurry such that air bubbles become trapped in the slurry; and c) forming particles of the slurry which subsequently solidify to form porous phosphate sulfur fertilizer particles, such that the porous phosphate sulfur fertilizer particle is in a continuous phase.

Furthermore, the present invention extends to a method for producing a porous phosphate sulfur fertilizer particle which is in a continuous phase, wherein the size of ground phosphate rock particles range from about 1 $\mu$m to about 50 $\mu$m. In a particular embodiment, the ground phosphate rock particles used in a method of the invention for producing a porous phosphate sulfur fertilizer have a size of about 5 $\mu$m.

Moreover, the ratio of ground phosphate rock particles to sulfur used in a method for producing a porous phosphate sulfur fertilizer particle of the invention can vary from anywhere from 1 part phosphate rock particles to two parts sulfur, to two parts phosphate rock particles to one part sulfur, by weight. Thus, the present invention permits one of ordinary skill in the art to tailor a porous phosphate sulfur fertilizer particle of the invention to the properties of a particular soil which is to be treated with the fertilizer. In a particular embodiment, the ratio of ground phosphate rock particles to sulfur is about 1:1, by weight.

In addition, the present invention extends to a method for producing a porous phosphate sulfur particle fertilizer, as described above, which can include additives beneficial to the soil. In one embodiment, the present invention extends to a method for producing a porous phosphate sulfur particle fertilizer as described above, further comprising the step of mixing around glauconite particles into the slurry, so that the porous fertilizer particle contains glauconite. The size of the glauconite particles used in a method of the invention can vary from about 1 μm to about 50 μm. In a particular embodiment of the invention, the size of the glauconite particles is about 5 μm. In addition, other nutrients beneficial to crops, such as urea, potassium, phenol, calcium, magnesium, phosphates, sulfates, copper manganese, boron, etc. can readily be added to the slurry prior to forming porous fertilizer particles of the invention.

What's more, the amount of glauconite particles used in a method of the invention, and thus the concentration of glauconite in a porous phosphate sulfur fertilizer particle of the invention, can vary. In particular, the ratio of the sum of ground glauconite particles and ground phosphate rock particles to sulfur used in a method of the invention can range from about 1:2 to about 2:1, by weight, and in a particular embodiment, is about 1:1 by weight. Moreover, the ratio of ground glauconite particles to ground phosphate particles in a method of the invention can vary. In a particular embodiment, the ratio is about 1:1, by weight.

Moreover, the invention provides methods for making porous phosphate sulfur fertilizer particles having other additives, e.g., urea, or polymers of urea and phenol, bentonite, or ion exchange resins. The amount of such additives added to a porous phosphate particle of the invention can vary about 5% to about 25% by weight of the porous fertilizer particle. In a method of making a porous phosphate particle of the invention, as described above, the additives are mixed into the slurry prior to whipping air into the slurry.

As explained above, ion exchange resins which traditionally are discarded as industrial waste, can be used in a method for producing a porous phosphate sulfur fertilizer particle of the invention. These resins prevent the leaching of charged nutrients, such as alkaline earth metals, nitrates, sulfates, etc. from the ground, thus making these nutrients available to crops. Moreover, these ion exchange resins are produced as cation exchange resins as well as anion exchange resins. The former can adsorb and exchange the cationic nutrients such as ammonia, potassium, calcium, magnesium, etc. The latter can adsorb and exchange anionic nutrients such as phosphate, nitrate, sulfate, etc. These adsorbed nutrients can form sustained release complexes that make the ionic nutrients available to plants in a controlled manner thereby diminishing the loss of nutrients to the environment. An example of a method of forming a porous phosphate sulfur fertilizer particle of the invention which is in a continuous phase and comprises an ion exchange resin, comprises the steps of mixing ground phosphate rock particles with molten sulfur to form a slurry, mixing an ion exchange resin into the slurry, whipping air into the slurry such that air bubbles become trapped in the slurry, and then forming particles of the slurry which subsequently solidify to form porous phosphate sulfur fertilizer particles which are in a continuous phase. Another method for producing such a fertilizer particle comprises the steps of forming a mixture of sulfur and ground phosphate rock, mixing an ion exchange resin into the mixture, heating the mixture such that the sulfur melts and a slurry is formed, whipping air into the slurry, and then forming particles of the slurry, which solidify to form porous phosphate sulfur fertilizer particles of the invention. Numerous ion exchange resins have applications in a method for producing a porous phosphate sulfur fertilizer particle of the invention. Examples of resins having applications herein include, but certainly are not limited to, an anion exchange resin, a cation exchange resin, an acrylic based ion exchange resin, a styrenic ion exchange resin, a zeolite, or a combination of these resins. What's more, the amount of ion exchange resin used in a method of the invention can range from about 5% to about 25% by weight of a porous phosphate particle of the invention, depending upon the desired concentration of ion exchange resin in a porous phosphate sulfur fertilizer particle of the invention.

Furthermore, the size of the pores in a porous phosphate sulfur fertilizer particle can vary, depending upon the amount of air whipped into a slurry of the method of the invention. In particular, the size of the pores in the particle can range from about 5 Å to about 500 Å, and in a particular embodiment, the pores have a size of about 25 Å. Naturally, the size of the pores in a particular porous phosphate fertilizer particle of the invention is effected by amount of air whipped into the slurry. In particular, the size of the pores of the particle are dependent upon the dispersion rate of air within the slurry, i.e., the volume of air per unit time per square foot of the cross sectional area of the slurry. Generally, the dispersion rate ranges from about 2 cubic feet of air per minute per square foot of the cross sectional area of the slurry to about 10 cubic feet of air per minute per square foot of the cross sectional area of the slurry. In a preferred embodiment, the dispersion rate is about 5 cubic feet of air per minute per square foot of the cross sectional area of the slurry.

Furthermore, numerous methods of whipping air into a slurry are available to the skilled artisan. One such method comprises pumping air into the slurry such that it bubbles through the slurry to the surface. Another method involves pumping air into the slurry while simultaneously mixing the slurry. Additional methods of whipping air into a slurry, which have applications in the instant Invention, are described in Perry's Chemical Engineering Handbook, 4th Ed., McGraw Hill, New York, 1963; Kunin, Robert, *Amber-Hi-Lites,* Tall Oaks Pub. Co., Littleton, CO (1996); *Concise Encyclopedia of Chemical Technology,* Kirk-Othmer, J. Wiley, 1985; and Farm, F. M., *The Boston—School Cook Book,* Little, Brown & Co., Boston, 1946 (p. 540).

Also, the present invention extends to a method described above for producing a porous phosphate sulfur fertilizer particle, wherein the step of forming particles of the slurry which subsequently solidify to form porous phosphate sulfur fertilizer particles comprises extruding the slurry with an extruder after air has been whipped into the slurry. Those of ordinary skill in the art are acquainted with the various types of extruders available, such as single screw or multiple screw extruders, which have applications herein. A particular example of an extruder having applications in the present invention is described infra. Alternatively, particles of the slurry can be formed by passing the slurry through a nozzle having a plurality of pores. The slurry passes through the pores, which forms particles of the slurry. Generally, the pores of the nozzle have a size ranging from about 10 μm to about 50 μm in diameter. In another embodiment, the slurry can be extruded with an extruder, and then passed through a nozzle having a plurality of pores. The size of the porous phosphate sulfur fertilizer particles of the invention can vary, depending upon the rate at which the particles are formed. In a particular embodiment, porous phosphate sulfur fertilizer particles of the invention range in size from about 20 to about 60 mesh (about 0.84 to about 0.25 mm in diameter).

The present invention further extends to a method for producing a porous phosphate sulfur fertilizer particle wherein the sulfur and phosphate rock particles are in a continuous phase, wherein the method comprises the steps of mixing ground phosphate rock particles with sulfur to form a mixture, heating the mixture to a temperature sufficient to melt the sulfur forming a slurry, whipping air into the slurry, and then forming particles of the slurry which solidify to form porous phosphate sulfur fertilizer particles which are in a continuous phase. In a preferred embodiment, the temperature to which the mixture is heated is at least greater than the melting point of sulfur, i.e., 120° C.

In another embodiment, the present invention extends to a porous phosphate sulfur fertilizer particle which is in a continuous phase, wherein the porous phosphate sulfur particle comprises ground phosphate particles and sulfur, and pores the fertilizer particle run from the outer surface of the fertilizer particle to its interior. The size of phosphate particles which have applications in a fertilizer particle of the invention can range from about 1 μm to about 50 μm. In a particular embodiment of a porous phosphate sulfur fertilizer particle of the invention, the ground phosphate rock particles have a size of about 5 μm.

Moreover, the quantities of ground phosphate rock particles and sulfur in a fertilizer particle of the invention can vary. In a particular embodiment, the ratio of ground phosphate rock particles to sulfur in a porous fertilizer particle of the invention ranges from about 1:2 to about 2:1, by weight, and particularly, is about 1:1, by weight.

Also, a porous phosphate sulfur fertilizer particle of the invention can comprise various nutrients and minerals in addition to sulfur and ground phosphate rock particles. An example of a mineral that can be added is ground glauconite particles. The size of the ground glauconite particles can vary, depending upon the application. In particular, the size of ground glauconite particles having applications in a fertilizer particle of the invention can range from about 1 μm to about 50 μm, and preferably have a size of about 5 μm, Moreover, the quantity of glauconite particles in a fertilizer particle of the invention can vary. In particular, the ratio of the sum of ground glauconite particles and ground phosphate rock particles to sulfur in porous fertilizer particle of the invention can range from about 1:2 to about 2:1, by weight. Preferably, the ratio of the sum of ground glauconite particles and ground phosphate rock particles to sulfur in a porous fertilizer particle of the invention is about 1:1 by weight.

Moreover, the present invention extends to a porous phosphate sulfur fertilizer particle as described above, further comprising various nutrients and additives to aide plant growth. Examples of such additives include, but certainly are not limited to, urea, potassium, polymers of urea and phenol, phenol, calcium, magnesium, phosphates, sulfates, copper manganese, boron, etc. Moreover, various types of ion exchange resins which have been previously used in industrial applications, can be included in a porous phosphate sulfur fertilizer particle of the invention. Examples of such resins include, but certainly are not limited to, an anion exchange resin, a cation exchange resin, an acrylic based ion exchange resin, a styrenic ion exchange resin, a zeolite, or a combination thereof. Other additives which can included in a porous phosphate sulfur particle of the invention include phenol, urea, or polymers or urea and phenol. Particular amounts of an such additives in a porous phosphate sulfur particle of the invention can range from about 5% to about 25% by weight of a porous phosphate particle of the invention, depending upon the desired concentration of additive in a porous phosphate sulfur fertilizer particle of the invention.

In addition, the present invention extends to a porous phosphate sulfur fertilizer particle as described above, wherein the pores of the particle range in size from about 5 Å to about 500 Å, and in a particular embodiment, the pores have a size of about 25 Å. These pores run from the outer surface of the particle to its interior, and permit sulfur oxidizing Thiobacullus microorganisms and water to enter the interior of the porous phosphate sulfur fertilizer particle and interact with sulfur in the interior of the particle to form sulfuric acid. Since the porous phosphate fertilizer particle of the invention is in a continuous phase, phosphate rock particles are immediately available to sulfuric acid and the rock phosphate can microorganisms. Thus, the reaction between the sulfuric acid and the rock phosphate can readily occur, which ultimately permits a greater amount of phosphate to be delivered to crops in a shorter period of time than the amount of phosphate made available using traditional phosphate fertilizers in which the rock phosphate is coated with sulfur.

In another embodiment, the present invention extends to a porous phosphate sulfur fertilizer particle which is in a continuous phase, which comprises ground phosphate particles and sulfur in a continuous form, wherein the fertilizer particle is produced with a method comprising the steps of:
 a) mixing around phosphate rock particles with molten sulfur to form a slurry;
 b) whipping air into the slurry such that air becomes trapped in the slurry; and
 c) forming particles of the slurry which subsequently solidify to form porous phosphate sulfur fertilizer particles.

What's more, the present invention extends to a porous phosphate sulfur fertilizer particle which is in a continuous phase, which comprises ground phosphate particles and sulfur and pores which run from the outer surface of the particle to the interior of the particle, wherein the porous phosphate sulfur fertilizer particle is produced with a method comprising the steps of:
 a) mixing ground phosphate rock particles with sulfur to form a mixture;
 b) heating the mixture to form a slurry;
 c) whipping air into the slurry such that air bubbles become trapped in the slurry; and
 d) forming particles of the slurry which subsequently solidify to form porous phosphate sulfur fertilizer particles.

Accordingly, it is a principle object of the invention to provide a method for producing porous phosphate sulfur fertilizer particles, wherein the porous phosphate sulfur fertilizer particle is in a continuous phase, and the pores of the porous fertilizer run from the outer surface of the particle to its interior. These pores particle permit water and Thiobacullus microorganisms in soil to have access to the interior of the particle. As a result, the rate of the reaction between sulfuric acid and rock phosphate to form soluble phosphate is increased, which permits an increase in production of soluble phosphate available to crops relative to the amount of phosphate made available to crops with traditional phosphate fertilizers wherein the rock phosphate is completely coated with sulfur.

It is another object of the invention to provide a method for producing a porous phosphate sulfur fertilizer particle, which comprises various nutrients and additives which are beneficial to plant growth. Examples of such additive includes, but certainly is not limited to, urea, potassium, phenol, polymers of urea and phenol, calcium, magnesium, phosphates, sulfates, copper manganese, boron, etc.

It is another object of the invention to provide a method for producing a porous phosphate sulfur fertilizer particle which is in a continuous phase, wherein the particle includes ion exchange resins. These resins prevent the leaching of nutrients from crops, and serve as a means to provide sustained release of nutrients.

These and other objects of the present invention will be better appreciated by reference to the following drawings and Detailed Description.

BRIEF DESCRIPTION OF THE DRAWINGS

FIG. 1 is a cross sectional schematical view of a porous phosphate sulfur fertilizer particle of the invention.

FIG. 2 is a schematical view of an apparatus having applications in a method for producing a porous phosphate sulfur fertilizer particle of the invention.

DETAILED DESCRIPTION OF THE INVENTION

The present invention is based upon the discovery of a heretofore unknown method for producing novel and useful porous phosphate sulfur fertilizer particles having a unique structure wherein the particle is in a continuous phase. In particular, it has been discovered that surprisingly and unexpectedly, this novel structure permits diffusion of water and Thiobacullus microorganisms to the interior of the particle. There, the microorganisms oxidize sulfur to form sulfuric acid. Since the particles are in a continuous phase,. phosphate is immediately available to react with the sulfuric acid to produce soluble phosphate. This soluble phosphate can then diffuse from the interior of the particle via the pores, and enter the ground. The chemical reactions involved in the production of such soluble phosphates are set forth below:

$2S+3O_2+2H_2O \rightleftharpoons 2H_2SO_4$

$Ca_3(PO_4)_2+2H_2SO_4 \rightleftharpoons Ca(H_2PO_4)_2.H_2O+2CaSO_4+2H_2O$

Broadly, the present invention extends to a method for producing a porous phosphate sulfur fertilizer particle which is in a continuous phase, comprising the steps of:

a) mixing ground phosphate rock particles with molten sulfur to form a slurry;

b) whipping air into the slurry such that air bubbles become trapped in the slurry; and c) forming particles of the slurry which subsequently solidify to form porous phosphate sulfur fertilizer particles, wherein the porous phosphate sulfate fertilizer particle is in a continuous phase.

In another embodiment, the present invention extends to a method for producing a porous phosphate sulfur fertilizer particle which is in a continuous phase, comprising the steps of:

a) mixing ground phosphate rock particles with sulfur to form a mixture;

b) heating the mixture to form a slurry;

c) whipping air into the slurry such that air bubbles become trapped in the slurry; and d) forming particles of the slurry which subsequently solidify to form porous phosphate sulfur fertilizer particles, wherein the porous phosphate sulfate fertilizer particle is in a continuous phase.

Furthermore, the present invention extends to a porous phosphate sulfur fertilizer particle which is in a continuous phase, wherein the porous fertilizer particle comprises ground phosphate particles and sulfur. The pores of the porous phosphate sulfur particle of the invention run from the outer surface of the particle to the its interior.

In yet another embodiment, the present invention extends to a porous phosphate sulfur fertilizer particle which is in a continuous phase, wherein the porous phosphate sulfur fertilizer particle comprises ground phosphate particles and sulfur, wherein the porous phosphate sulfur fertilizer particle is produced from a method comprising the steps of:

a) mixing ground phosphate rock particles with molten sulfur to form a slurry;

b) whipping air into the slurry such that air bubbles become trapped in the slurry; and c) forming particles of the slurry which subsequently solidify to form porous phosphate sulfur fertilizer particles of the invention.

Furthermore, the present invention extends to a porous phosphate sulfur fertilizer particle which is in a continuous phase, wherein the porous phosphate sulfur fertilizer particle comprises ground phosphate particles and sulfur, and the porous phosphate sulfur fertilizer particle is produced from a method comprising the steps of:

a) mixing ground phosphate rock particles with sulfur to form a mixture;

b) heating the mixture to form a slurry;

c) whipping air into the slurry such that air bubbles become trapped in the slurry; and d) forming particles of the slurry which subsequently solidify to form porous phosphate sulfur fertilizer particles of the invention.

In addition, numerous terms and phrases are used throughout the instant Specification and Claims are defined below. In particular:

As used herein, the phrase "in a continuous phase" in regards to a porous phosphate sulfur fertilizer particle of the invention comprising at least two components wherein one component of the particle is neither covered completely nor coated by another component of the particle. Thus, in a porous phosphate fertilizer particle of the invention, particles of phosphate rock are not coated with sulfur. Instead, particles of phosphate rock are adjacent to particles of sulfur, and pores of air. Hence, sulfuric acid produced by Thiobacullus microorganisms is able to immediately react with rock phosphate particles which are not coated with sulfur. As a result, the rate of production of soluble phosphate for crops is increased relative to the rate of soluble phosphate produced by traditional phosphate fertilizers wherein the rock phosphate is completely coated with sulfur.

As used herein, the term "particle" refers to an extremely small piece, or a tiny fragment.

As used herein, the term "slurry" refers to refers to a mixture comprising a liquid and particles of a material insoluble in the liquid.

As used herein, the phrase "whipping air into the slurry" refers to beating the slurry so as to incorporate air into the slurry, or mixing the slurry while air is being pumped into the slurry.

As used herein, the term "mesh" refers to refers to the openings of a net usually expressed as a distance between the openings that contain the particles. Thus, mesh is a unit of length used to determine the size of particles. Table 1 sets forth screen equivalents.

TABLE 1

| | Screen Equivalents | | | | | | | |
|---|---|---|---|---|---|---|---|---|
| | U.S. Standard | | | Tyler Standard | | | British Standard | |
| Sieve | Opening | | meshes | Opening | | meshes | Opening | |
| No. | mm | inches | per inch | mm | inches | per inch | mm | inches |
| 12 | 1.68 | 0.0661 | 10 | 1.65 | 0.065 | 10 | 1.68 | 0.0660 |
| 14 | 1.41 | 0.0555 | 12 | 1.40 | 0.055 | 12 | 1.40 | 0.0553 |
| 16 | 1.19 | 0.0469 | 14 | 1.17 | 0.046 | 14 | 1.20 | 0.0474 |
| 18 | 1.00 | 0.0394 | 16 | 0.991 | 0.039 | 16 | 1.00 | 0.0395 |
| 20 | 0.84 | 0.0331 | 20 | 0.833 | 0.0328 | 18 | 0.853 | 0.0336 |
| 25 | 0.71 | 0.0280 | 24 | 0.701 | 0.0276 | 22 | 0.699 | 0.0275 |
| 30 | 0.59 | 0.0232 | 28 | 0.589 | 0.0232 | 25 | 0.599 | 0.0236 |
| 35 | 0.50 | 0.0197 | 32 | 0.495 | 0.0195 | 30 | 0.500 | 0.0197 |
| 40 | 0.42 | 0.0165 | 35 | 0.417 | 0.0164 | 36 | 0.422 | 0.0166 |
| 45 | 0.35 | 0.0138 | 42 | 0.351 | 0.0138 | 44 | 0.353 | 0.0139 |
| 50 | 0.297 | 0.0117 | 48 | 0.295 | 0.0116 | 52 | 0.295 | 0.0116 |
| 60 | 0.250 | 0.0098 | 60 | 0.246 | 0.0097 | 60 | 0.251 | 0.0099 |
| 70 | 0.210 | 0.0083 | 65 | 0.208 | 0.0082 | 72 | 0.211 | 0.0083 |
| 80 | 0.177 | 0.0070 | 80 | 0.175 | 0.0069 | 85 | 0.178 | 0.007 |
| 100 | 0.149 | 0.0059 | 100 | 0.147 | 0.0058 | 100 | 0.152 | 0.006 |
| 200 | 0.074 | 0.0029 | 200 | 0.074 | 0.0029 | 200 | 0.076 | 0.003 |
| 325 | 0.044 | 0.0017 | 325 | 0.043 | 0.0017 | 240 | 0.066 | 0.0026 |

As used herein, the term "porous" to describe a particle indicates the particle contains pores which lead from the surface of the particle to its interior, wherein the pores have a diameter ranging from about 5 to about 500 Å.

As used herein, the term "stoichiometric" refers to the quantity of reactants employed according to the equivalent weights of the reactants. For example, in the following reactions:

$$2S + 3O_2 + 2H_2O \rightleftharpoons 2H_2SO_4$$

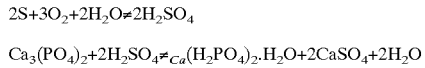

A "stoichiometric" reaction involves reacting 2 moles of sulfur with 3 moles of oxygen and 2 moles of water to produce 2 moles of sulfuric acid.

As explained above, FIG. 1 is a schematical cross sectional view of a porous phosphate sulfur fertilizer particle of the invention. In particular, the ground phosphate particles (1) are imbedded in and throughout sulfur (2) within particle (4), such that sulfur (2) and ground phosphate particles (1) are in a continuous phase. As a result, the phosphate particles (1) are not completely coated with sulfur (2). The size of the ground phosphate particles (1) of a porous fertilizer particle of the invention can vary, and are discussed above. Also present in FIG. 1 are pores (3). Pores (3) run throughout particle (4), and particularly from the outer surface of particle (4) to its interior. Optionally, particle (4) can include various minerals, such as glauconite, and numerous additives and nutrients, which are discussed above.

FIG. 2 refers to an apparatus which can be used in a method of the invention for producing a porous phosphate sulfur fertilizer particle comprising ground phosphate rock particles and sulfur, wherein the porous fertilizer particle is in a continuous phase. It should be readily apparent that numerous apparatuses readily available to the skilled artisan can be used to practice the method of the invention, and that the apparatus schematically depicted in FIG. 2 is only exemplary. In FIG. 2, rock phosphate is initially ground in grinder (5) to form ground phosphate rock particles. As explained above, the size of the ground phosphate rock particles can vary from about 1 μm to about 50 μm. In a particular embodiment of the invention, the ground phosphate rock particles have a size of about 5 μm. Numerous grinders readily available to the skilled artisan can be used in the method of the invention to form such ground phosphate rock particles. Hence, grinding of rock phosphate may be conducted in many ways, including those ways described in Perry's Handbook, supra. Furthermore, the operation of the grinder may be conducted batch wise or in a continuous manner. In addition, the various additives in a porous phosphate sulfur fertilizer of the invention, e.g., glauconite and ion exchange resins, may be introduced into the grinding mill along with the rock phosphate. A particular grinder having applications in the present invention is described on page 25 of Perry's Chemical Engineering Handbook, 4th Edition, McGraw-Hill and Company, New York, 1963; and in Kunin, Ion Exange Resins, Wiley, New York ( 1990), wherein both references are hereby incorporated by reference in their entireties.

After being ground in grinder (5), the ground phosphate rock particles enter mixer (6). Reservoir (7), which holds elemental sulfur, is in fluid communication with mixer (6) via tube (8). Heating coil (9) is wrapped around tube (8) and is electrically connected to electrical power source (10). When an electric current passes through coil (9), coil (9) undergoes resistive heating, which heats sulfur in tube (8) to a temperature greater than the melting point of sulfur, i.e., greater than 120° C. Thus, when sulfur enters mixer (6), it is in molten form. Naturally, numerous other means can be used to melt sulfur or a mixture of sulfur and ground phosphate rock particles, which are readily available to the skilled artisan. Particular examples include placing a flame under the sulfur or mixture, bombarding the mixture or sulfur with electromagnetic radiation, etc.

Once inside mixer (6), the molten sulfur and the ground phosphate rock particles are mixed to form a slurry. Optionally, additives such as ion exchange resins, glauconite, urea, polymers of urea, etc. can be added to the slurry while in mixer (6). Generally, the amount of such additives added can range from about 5% to about 25% of the finished fertilizer particles by weight. Mixer (6) is in fluid communication with beater (11). Air is then pumped into slurry in beater (11) via valve (12). With air and the slurry in beater (11), the slurry is whipped so as to incorporate air into the slurry. Optionally, air outlet valve (13) is provided in beater (11) to vent excess air from beater (11) thus preventing a buildup of pressure. After air is whipped into the slurry, the slurry is passed through nozzle (12), having multiple openings. As a result of passing through nozzle (12), the slurry is separated into discrete particles. Subsequent to their formation, these particles solidify to form porous phosphate sulfur fertilizer particles of the invention.

Optionally, particles of the invention can be formed by passing the slurry through an extruder after air is whipped into the slurry. In particular, after air has been whipped into the slurry, the slurry is extruded from beater (11) via extruder (15) into pellets which solidify and form the fertilizer particles of the invention. Numerous extruders have applications in the present invention. In particular, examples of an extruder having applications herein is disclosed in *Perry's Handbook,* Chapter 19(11) and Plastic *Engineeriizg Handbooks, Cellular Plastics,* AlChe, N.Y.C. (1990), which are which are hereby incorporated by reference herein in their entireties. Generally during an extruder process of the invention, the slurry of the invention is passed along single or multiple screw conveyers of an extruder under pressure, and then through a die (or multiple dies) of an extruder. After passing through the die, the slurry is cut into small particles. These particles in turn solidify to form porous phosphate sulfur fertilizer particles of the invention.

As a result of this method, porous phosphate sulfur fertilizer particles are formed wherein the ground phosphate particles and sulfur are in a continuous phase.

The present invention may be better understood by reference to the following non-limiting Examples, which are provided as exemplary of the invention. The following examples are presented in order to more fully illustrate the preferred embodiments of the invention. They should in no way be construed, however, as limiting the broad scope of the invention.

EXAMPLE I

Ordinary rock phosphate from the Tennessee Valley Authority (TVA) was ground in conventional grinding mills such as, for example, ball, rod and hammer mills described in Perry's Chemical Engineering Handbook, which is hereby incorporated by reference herein in its entirety. In particular, a ball mill grinder is used in this example, which comprises a rotating vessel with steel balls in the vessel. The kinetic energy of the rotating vessel is transduced to the balls, which collide with the rock phosphate forming rock phosphate particles. The average size of the ground particles is about 20 microns. The particles are then mixed with a stoichiometric amount of amorphous sulfur to form a mixture, which is then heated to a temperature of about 120° C., forming a slurry. Air is then whipped into the slurry using the procedure of FIG. 2. In particular, air is pumped into the slurry at a dispersion rate of about 2 cubic feet per minute. After air has been trapped into the slurry, the slurry is then granulated and extruded in a conventional extruder forming fertilizer particles of the invention. (ca. 50 mesh). These particles can then be applied to soil. Since most soils already contain Thiobacillus microorganisms which oxidize sulfur, cultures of such microorganisms need not be added to the soil. However, if the soil to be treated does not contain such microorganisms, then optionally, Thiobacillus microorganisms can be added to the fertilizer of the invention prior to fertilization.

In this Example, normal loam experimental soil from Bucks County, PA was fertilized with a porous fertilizer particle of the invention produced with the method described above, at a ration of 10 lbs of particles to 100 lbs of soil. A control soil was fertilized with rock phosphate only at the same concentration, and wheat was cultivated on both the control and experimental soil. Approximately three (3) months after fertilization, both the experimental and control soil was analyzed for citrate soluble phosphates using the procedure set forth in G. H. Collins, *Commercial Fertilizers,* P. Blakiston's and Son, Inc., Philadelphia, Pa., 1933, which is hereby incorporated by reference in its entirety. The teachings of Collins permits a skilled artisan to determine the amount of soluble phosphate in the soil. In the experimental soil, greater than 95% of the phosphate of the porous phosphate sulfur fertilizer particles became available to the wheat. In the control soil however, only about 10% of the phosphate from the rock phosphate became available to the wheat.

EXAMPLE II

In this Example, porous phosphate fertilizer particles similar to those of produced and used in Example I were produced and used. However, glauconite was added to the particles during manufacture such that the ratio of glauconite to phosphate particles to sulfur in the porous phosphate fertilizer particles was about 1:1:1 by weight. The glauconite particles used had a size of about 5 μm. An experiment similar to that of Example I, involving the cultivation of wheat, was conducted. In particular, the porous phosphate fertilizer particles comprising glauconite were used to fertilize experimental normal loam soil from Bucks County PA at a ration of porous fertilizer particles of about 10 lbs of particles to 100 lbs of soil. A control soil was fertilized with rock phosphate particles only at the same ration. Wheat was then planted on the experimental and control soil and allowed to grow for about three months. After about three months had passed, the experimental and control soil was analyzed for citrate soluble phosphates using the procedure set forth in G. H. Collins, *Commercial Fertilizers,* P. Blakiston's and Son, Inc., Philadelphia, Pa., 1933. The results of this assay indicate that greater than 95% of the phosphate in the porous phosphate fertilizer particles comprising glauconite became available to wheat grown in the experimental soil, while only about 10% of the phosphate from the rock phosphate became available to wheat grown in the control soil.

EXAMPLE III

In this example, porous phosphate fertilizer particles similar to those of Example I were used. However, during the production of the particles, urea was added such that the ratio of urea to sulfur to phosphate in the porous phosphate sulfur particle used herein was about 1:1:1 by weight. These particles were then used to fertilize experimental normal loam soil from Bucks County PA at a concentration of about 10 lbs of fertilizer to about 100 lbs of soil. Approximately three months after fertilization, an analysis of available phosphate in the soil was made using the procedure set forth in G. H. Collins, *Commercial Fertilizers,* P. Blakiston's and Son, Inc., Philadelphia, Pa., 1933. The results of this assay indicated that greater than 95% of phosphate from the fertilizer was made available to the soil. Thus, urea did not interfere with the release of phosphate.

A second experiment was then conducted in which these porous phosphate sulfur fertilizer particles comprising urea were used to fertilize an experimental normal loam soil from Bucks County, PA at a ration of about 10 lbs of particles to 100 lbs of soil. A control soil was fertilized with rock phosphate particles only at the same ration. Wheat was then planted on the experimental and control soil and allowed to grow for about three months. After three months had passed, the experimental and control soil were analyzed for citrate soluble phosphates using the procedure set forth in G. H. Collins, *Commercial Fertilizers*, P. Blakiston's and Son, Inc., Philadelphia, Pa., 1933. The results clearly indicate that greater than 95 % of the phosphate in the porous phosphate fertilizer particles comprising urea became available to wheat grown in the experimental soil, while only about 10% of the phosphate from the rock phosphate became available to wheat grown in the control soil. Thus, urea does not interfere with making phosphate available to the soil.

Various publications are cited herein, the disclosures of which are incorporated by reference in their entireties Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

What is claimed is:

1. A method for producing a porous phosphate sulfur fertilizer particle which is in a continuous phase, the method comprising the steps of:
   a) mixing ground phosphate rock particles and an ion exchange resin with molten sulfur to form a slurry;
   b) whipping air into the slurry such that air becomes trapped in the slurry; and
   c) forming particles of the slurry which subsequently solidify to form porous phosphate sulfur ion exchange resin fertilizer particles,
   such that porous phosphate sulfur ion exchange resin fertilizer particles are in a continuous phase.

2. The method of claim 1, wherein the ground phosphate rock particles have a size of about 1 $\mu$m to about 50 $\mu$m.

3. The method of claim 2, wherein the ground phosphate rock particles have a size of about 5 $\mu$m.

4. The method of claim 1, wherein the ratio of ground phosphate rock particles to sulfur ranges from about 1:2 to about 2:1, by weight.

5. The method of claim 4, wherein the ratio of ground phosphate rock particles to sulfur is about 1:1, by weight.

6. The method of claim 1, further comprising the step of mixing ground glauconite particles into the slurry prior to whipping air into the slurry.

7. The method of claim 6, wherein the ground glauconite particles have a size of about 1 $\mu$m to about 50 $\mu$m.

8. The method of claim 7, wherein the ground glauconite particles have a size of about 5 $\mu$m.

9. The method of claim 6, wherein the ratio of the sum of ground glauconite particles and ground phosphate rock particles to sulfur in the slurry ranges from about 1:2 to about 2:1, by weight.

10. The method of claim 9, wherein the ratio of glauconite particles to ground phosphate rock particles to sulfur in the slurry is about 1:1:1 by weight.

11. The method of claim 1, further comprising the step of mixing an additive into the slurry prior to whipping air into the slurry.

12. The method of claim 11, wherein the additive comprises urea, potassium, polymers of urea and phenol, phenol, calcium, magnesium, phosphates, sulfates, copper manganese or boron.

13. The method of claim 1, wherein the ion exchange resin comprises an anion exchange resin, a cation exchange resin, an acrylic based ion exchange resin, a styrenic ion exchange resin, a zeolite, or a combination thereof.

14. The method of claim 1, wherein the quantity of ion exchange mixed into the slurry comprises about 5% to about 25% of the porous phosphate sulfur particle by weight.

15. The method of claim 1, wherein the pores of the porous phosphate sulfur ion exchange resin fertilizer particles have a size ranging from about 5 to about 500Å, and the pores run from the outer surface of the porous phosphate sulfur ion exchange resin fertilizer particle to the interior of the porous phosphate sulfur ion exchange resin fertilizer particle.

16. The method of claim 1, wherein the step of forming porous phosphate sulfur ion exchange resin fertilizer particles comprises extruding the slurry with an extruder after air has been whipped into the slurry.

17. The method of claim 1, wherein the step of mixing ground phosphate rock particles with molten sulfur and an ion exchange resin to form the slurry comprises mixing ground phosphate rock particles with sulfur and an ion exchange resin to form a mixture, and then heating the mixture to at least 120° C.

18. The method of claim 1, wherein the porous phosphate sulfur fertilizer particles have a size ranging from about 20 to about 60 mesh.

19. A porous phosphate sulfur ion exchange resin fertilizer particle which is in a continuous phase, comprising sulfur, ion exchange resin and ground phosphate particles, wherein the pores of the porous phosphate sulfur ion exchange resin fertilizer particle run from the outer surface of the porous phosphate sulfur ion exchange resin fertilizer particle to the interior of said porous phosphate sulfur ion exchange resin fertilizer particle.

20. The porous phosphate sulfur ion exchange resin fertilizer particle of claim 19, wherein the ground phosphate rock particles have a size of about 1 $\mu$m to about 50 $\mu$m.

21. The porous phosphate sulfur ion exchange resin fertilizer particle of claim 19, wherein the ground phosphate rock particles have a size of about 5 $\mu$m.

22. The porous phosphate sulfur ion exchange resin fertilizer particle of claim 19, wherein the ratio of ground phosphate rock particles to sulfur in the fertilizer particle ranges from about 1:2 to about 2:1, by weight.

23. The porous phosphate sulfur ion exchange resin fertilizer particle of claim 22, wherein the ratio of ground phosphate rock particles to sulfur is about 1:1, by weight.

24. The porous phosphate sulfur ion exchange resin fertilizer particle of claim 19, further comprising ground glauconite particles.

25. The porous phosphate sulfur ion exchange resin fertilizer particle of claim 24, wherein the ground glauconite particles have a size of about 1 $\mu$m to about 50 $\mu$m.

26. The porous phosphate sulfur ion exchange resin fertilizer particle of claim 25, wherein the ground glauconite particles have a size of about 5 $\mu$m.

27. The porous phosphate sulfur ion exchange resin fertilizer particle of claim 24, wherein the ratio of the sum of ground glauconite particles and ground phosphate rock particles to sulfur in the fertilizer particle ranges from about 1:2 to about 2:1, by weight.

28. The porous phosphate sulfur ion exchange resin fertilizer particle of claim 27, wherein the ratio of the ground glauconite particles to ground phosphate rock particles to sulfur in the porous phosphate sulfur fertilizer particle is about 1:1:1 by weight.

29. The porous phosphate sulfur ion exchange resin fertilizer particle of claim 19, further comprising an additive.

30. The porous phosphate sulfur ion exchange resin fertilizer particle of claim 29, wherein the additive comprises urea, phenol, or a polymer of urea and phenol.

31. The porous phosphate sulfur ion exchange resin fertilizer particle of claim 30, wherein the additive comprises about 5% to about 25% of the porous phosphate sulfur ion exchange resin fertilizer particle by weight.

32. The porous phosphate sulfur fertilizer particle of claim 30, wherein the ion exchange resin comprises an anion exchange resin, a cation exchange resin, an acrylic based ion exchange resin, a styrenic ion exchange resin, a zeolite, or a combination thereof.

33. The method of claim 29, wherein the additive comprises magnesium, phosphates, sulfates, copper, manganese, or boron.

34. The porous phosphate sulfur ion exchange resin particle of claim 19, wherein the pores of the fertilizer particle have a size ranging from about 5 Å to about 500 Å.

* * * * *